Feb. 11, 1936. A. MEISSNER 2,030,648

MAGNET SYSTEM

Filed June 24, 1932

Inventor:
Alexander Meissner,
by Charles E. Miller
His Attorney.

Patented Feb. 11, 1936

2,030,648

UNITED STATES PATENT OFFICE 2,030,648

MAGNET SYSTEM

Alexander Meissner, Berlin-Dahlem, Germany, assignor to General Electric Company, a corporation of New York Application June 24, 1932, Serial No. 619,141
In Germany June 25, 1931

6 Claims. (Cl. 179—115.5)

My invention relates to magnet systems, more particularly for use in connection with electrodynamical loudspeakers.

In order to increase the efficiency of loudspeakers, particularly of the electrodynamical kind, it is necessary to considerably increase the field intensity or the number of lines of force influencing the oscillating member. It has been found that field intensities of 15,000 to 20,000 gauss are desirable, which considerably exceed the field intensities commonly in use in electrical machines. If field intensities of this magnitude are used, the output is increased accordingly but the exciting coils are heated accordingly also.

It is an object of my invention to provide a magnet system in which considerably higher field intensities than hitherto used, for instance within the range indicated above, are obtained and in which the occurrence of undesired rises of temperature is avoided. In order to accomplish this, I surround the magnet coil with a metal shell provided with cooling ribs. Preferably also all other metal parts of the magnet system, for instance the core, the iron shell etc. are metallically connected with each other and with the cooling ribs. Preferably this connection is effected by means of a material having a very high heat conductivity. Preferably all interstices and air gaps in the magnet system, for instance between the coil and the shell, are filled with an insulating material having a high heat conductivity so that the temperature of the coil system is merely a little higher than that of the metal shell. Care should however be taken that thereby the insulation of the coil is not impaired in any manner. Preferably an alcoholic solution of shellac or a solidifying sealing compound, to which is admixed a heat conductive electrically insulating material, for instance fine-grained quartz, sand or the like, this additional matter preferably forming at least 30% of the mixture, are used to fill the gaps. For while such compounds have the same insulating properties as the well known insulating materials, their heat conductivity is three to five times greater. Preferably the coil itself is insulated by such compounds containing quartz. In this manner a very good abduction of heat within and without the coil is obtained so that the drop of temperature from the inside of the coil to the cooling ribs merely amounts to a few degrees and undesired overtemperatures are avoided. This is particularly important in view of the fact that a loudspeaker is designed for use in households and should have the highest possible security against short-circuits, undue heating or the like. Sometimes it may also be useful to exclude certain portions of the driving system from the heat abduction and to allow for these portions a higher temperature as is normally admitted. For instance the vibrating coil of the electrodynamic drive is preferably not included in the heat conductive system.

In the drawing affixed to this specification and forming part thereof some embodiments of my invention are illustrated diagrammatically by way of example.

In the drawing

Figure 1:
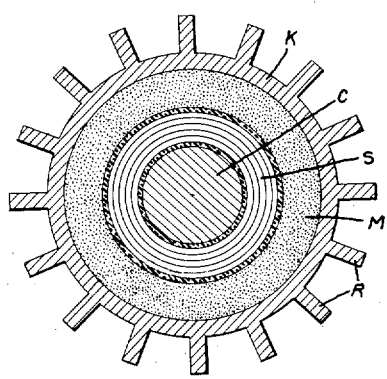
Fig. 1 is a plan section of one.

Referring first to Fig. 1, S is the exciting coil of a magnet system and C is a core extending through a central opening of the coil. K is the cooling shell being cast from light metal and provided with radially arranged cooling ribs R. The gap between the coil S and the shell K is filled with a quartz compound M.

In operation the heat produced in the magnet system, and more particularly in coil S, is transmitted through the compound M to the shell K and to the cooling ribs R, from which it is rapidly abducted by the surrounding air.

Figure 2:
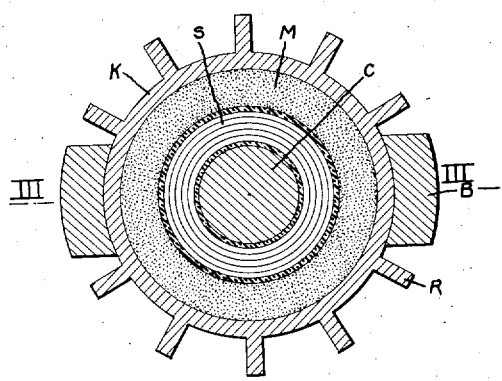
Fig. 2 is a similar section of another embodiment, taken on the lines II—II in Fig. 3.
Figure 4:
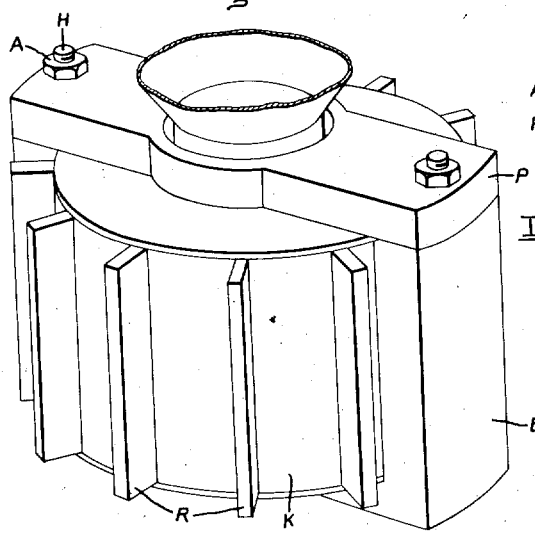
Fig. 4 is a perspective view of the device shown in Figs. 2 and 3.
Figure 3:
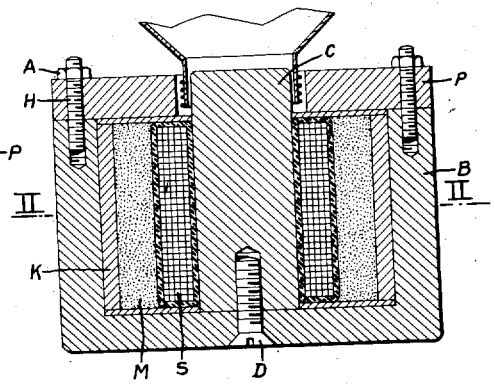
Fig. 3 is a vertical section on the lines III—III in Fig. 2.

In Figs. 2 to 4, B is a U-shaped iron strip, the lower part of which is attached to the core C by means of a screw D. The legs of the strip extend upwardly outside the metal shell K and are bridged by a cover plate P having a perforation into which extends the upper end of the core C so that a circular air gap is formed surrounding the upper end of the core. The plate is secured in its position by means of connecting rods H and screw nuts A. The cooling ribs R of the metal shell K extend parallel to the legs of the strip B and are arranged at the sides of the shell not covered by the strip legs. The operation of this magnet corresponds substantially to that shown in Fig. 1.

I wish it to be understood that I do not desire to be limited to the exact details of construction shown and described for obvious modifications will occur to a person skilled in the art.

In the claims affixed to this specification no selection of any particular modification of the invention is intended to the exclusion of other modifications thereof and the right to subsequently make claim to any modification not covered by these claims is expressly reserved.

I claim:—

1. An electrodynamic loudspeaker driving unit comprising a core, a magnet coil surrounding said core, magnetic flux conducting means to complete a magnetic circuit through said core, a metal shell surrounding said coil and mounted between said coil and said flux conducting means, the field intensity in the magnetic circuit being maintained at a relatively high value of the order of 15000 to 20000 gauss, said core and coil being so dimensioned and arranged that undesirable temperature rise tends to occur in the coil at said field intensity, and means to prevent said undesirable temperature rise in the magnet coil at said field intensity, said means including cooling ribs forming part of said shell and a filling of insulating material having relatively very high heat conductivity arranged in the gap between said coil and shell.

2. A magnet system for electrodynamic loudspeakers comprising an exciting coil, a metal shell surrounding said coil, an iron core within said coil, means to complete a magnetic circuit including a substantially U-shaped flat iron strip of substantial cross section throughout its length having a mid portion magnetically connected to said core and leg portions extending outside of said shell, a flat cover plate of substantial cross section throughout its length magnetically connected to the ends of said leg portions and having a central aperture, the free end of said core projecting within said aperture to form an air gap in said magnetic circuit, and cooling ribs on said shell protruding from the outer surface of said shell not covered by said legs.

3. A magnet system for electrodynamic loudspeakers comprising a core, an exciting coil surrounding said core, magnetic flux conducting means to complete a magnetic circuit through said core, a vibrating driving coil, a metal shell surrounding said exciting coil and mounted between said coil and said flux conducting means, cooling ribs forming part of said shell, and means for rapid transfer of heat from said exciting coil to said shell and ribs thereby to prevent undesirable temperature rise in said magnet system at field intensities in the magnetic circuit of 15000 to 20000 gauss, said means comprising an insulating filling having high heat conductivity arranged in the gap between said exciting coil and shell, said vibrating coil being so mounted with reference to said exciting coil, said shell and said filling as to be outside of the path of the heat rapidly transferred from said exciting coil to said shell through said filling.

4. A magnet system for electrodynamic loudspeakers comprising an exciting coil, an iron core within said coil, a metal shell spaced from and surrounding said coil, means to complete a magnetic circuit including a U-shaped iron strip of substantial cross section throughout its length having a mid portion magnetically connected to said core and leg portions extending outside of said shell, a cover plate of substantial cross section throughout its length magnetically connected to the ends of said leg portions and having a central aperture, said core projecting within said aperture to form an air gap in said circuit, cooling ribs on said shell protruding from the outer surface thereof not covered by said legs, and a filling containing shellac and quartz in the space between said coil and shell.

5. A magnet system for electrodynamic loudspeakers comprising an exciting coil and an iron core therewithin, a metal shell surrounding said coil, means to complete a magnetic circuit including an iron member of substantial cross section throughout its length magnetically connected to said core, a second iron member of substantial cross section throughout its length magnetically connected to the ends of said first-named iron member and having an aperture, one of said iron members having portions extending outside of and partially surrounding said shell, said core projecting within said aperture to form an air gap in said circuit, and cooling ribs on said shell protruding from the outer surface thereof not covered by said portions extending outside said shell.

6. A magnet system for electrodynamic loudspeakers comprising an exciting coil and an iron core therewithin, a metal shell surrounding said coil, means to complete a magnetic circuit including an iron member of substantial cross section throughout its length magnetically connected to said core, a second iron member of substantial cross section throughout its length magnetically connected to the ends of said first-named iron member and having an aperture, one of said iron members having portions extending outside of and partially surrounding said shell, said core projecting within said aperture to form an air gap in said circuit, cooling ribs on said shell protruding from the outer surface thereof not covered by said portions extending outside said shell, and a layer of insulating material of high heat conductivity between said coil and shell.

ALEXANDER MEISSNER.